United States Patent
Weiss

(10) Patent No.: US 6,721,068 B2
(45) Date of Patent: Apr. 13, 2004

(54) TWO-PART COLOR BAR PROCESS TO ENSURE CALIBRATION OF PROOFING EQUIPMENT

(76) Inventor: Mark A. Weiss, 1141 Delene Rd., Rydal, PA (US) 19046

( * ) Notice: Subject to any disclaimer, the term of this patent is extended or adjusted under 35 U.S.C. 154(b) by 0 days.

(21) Appl. No.: 10/192,404

(22) Filed: Jul. 10, 2002

(65) Prior Publication Data

US 2003/0164963 A1 Sep. 4, 2003

Related U.S. Application Data

(60) Provisional application No. 60/357,907, filed on Feb. 19, 2002.

(51) Int. Cl.$^7$ .............................................. G06F 15/00
(52) U.S. Cl. ..................... 358/1.9; 358/504; 358/518; 101/171
(58) Field of Search ..................... 358/1.9, 504, 518, 358/531, 540, 1.15; 101/171, 201, 203, 365

(56) References Cited

U.S. PATENT DOCUMENTS

| | | |
|---|---|---|
| 5,317,425 A | 5/1994 | Spence et al. |
| 5,333,069 A | 7/1994 | Spence |
| 5,598,272 A | 1/1997 | Fisch et al. |
| 5,953,990 A | 9/1999 | Chalmers |
| 6,075,614 A | 6/2000 | Ohtsuka et al. |
| 6,160,912 A | 12/2000 | Usami |
| 6,185,001 B1 | 2/2001 | Webendorfer et al. |
| 6,215,562 B1 | 4/2001 | Michel et al. |
| 6,268,932 B1 | 7/2001 | Lee et al. |
| 6,310,637 B1 | 10/2001 | Shimada et al. |

OTHER PUBLICATIONS

Color Proofing 2000, Vue/Point 2000 conference, printout of article from web site: http://www.digitalout.com/back%20edit/edittopic111.html, printout date: May 30, 2003, 9 pages.*

General Requirements for Applications in Offset Lithography, printouts from GRACoL web sites: http://www.gracol.com/tech.html and http://www.gracol.com/pdf/gracol—colorbar.pdf, printout date: Jun. 2, 2003, original posting date: unknown, 2 pages.*

(List continued on next page.)

Primary Examiner—Mark Wallerson
(74) Attorney, Agent, or Firm—Akin Gump Strauss Hauer & Feld LLP

(57) ABSTRACT

A hard proof is created that can be visually inspected to determine if it meets industry standards. The proof has a content image portion and color bar image data. To create the hard proof, a sheet of proofing paper is provided that has one or more known good first color bars pre-printed thereon, but no content image portion printed thereon. The content image portion of the proof and one or more second color bars are then printed on the sheet of proofing paper. The one or more second color bars are printed on the proofing paper in a pre-defined relationship to the one or more first color bars so as to allow for visual inspection directly on the proofing paper using only the color bar image data of the first and second color bars, and without using any external color reference materials. A visually discernable color match indicates that a proof which meets industry standards has been made and a visually discernable color mismatch indicates that a proof which meets industry standards has not been made.

10 Claims, 3 Drawing Sheets

(2 of 3 Drawing Sheet(s) Filed in Color)

Pre-Printed Color Bar on Proofing Paper prior to use

Valid Proof with matching Color Bar printed on an Inkjet

OTHER PUBLICATIONS

O.R.I.S.™ Digital Proofing System—SWOP™ Off–Press Proof Application Data Sheet, CGS/Publishing Technologies International, LLC, date unknown, 6 pages.

Photoshop 6 Color Management tutorial, copyright ®2001 Cone Editions Press, Ltd., 3 pages.

Fraser, B. "Out of Gamut: Color–Correct Vocabulary," copyright ©1999–2001 Creativepro.com, Inc., 7 pages.

Glossary of color management terms, printout from web site: http://www.adobe.com/support/techguides/color/cms$_{13}$ glossary/A.html through X.html, web page printout date: May 10, 2002, Copyright ©2002 Adobe Systems Incorporated, 32 pages.

Fanning, D. "Review: DesignJet 10ps," Macworld, Jan. 2, 2002, 3 pages.

Color Control from Proof to Press, Transcript from: Seybold Semimars Boston/Publishing '99—Best Practices for Publishing Workflows Conference, Mar. 4, 1999, 20 pages.

Ryobi PDS–ProE brochure, printout from Ryobi Ltd. web site: http://www.ryobe–group.co.jp/en/projects/printing/Products/spec03b.html, printout date: May 13, 2002, 2 pages.

Digital Proofing: What are you proofing?, GATF Color Management Conference 2001, Renaissance Photographic Imaging, Copyright ©2001 Dan Reid, 15 pages.

PCT International Search Report for PCT/US03/04663, mailed Oct. 30, 2003, 4 pages.

* cited by examiner

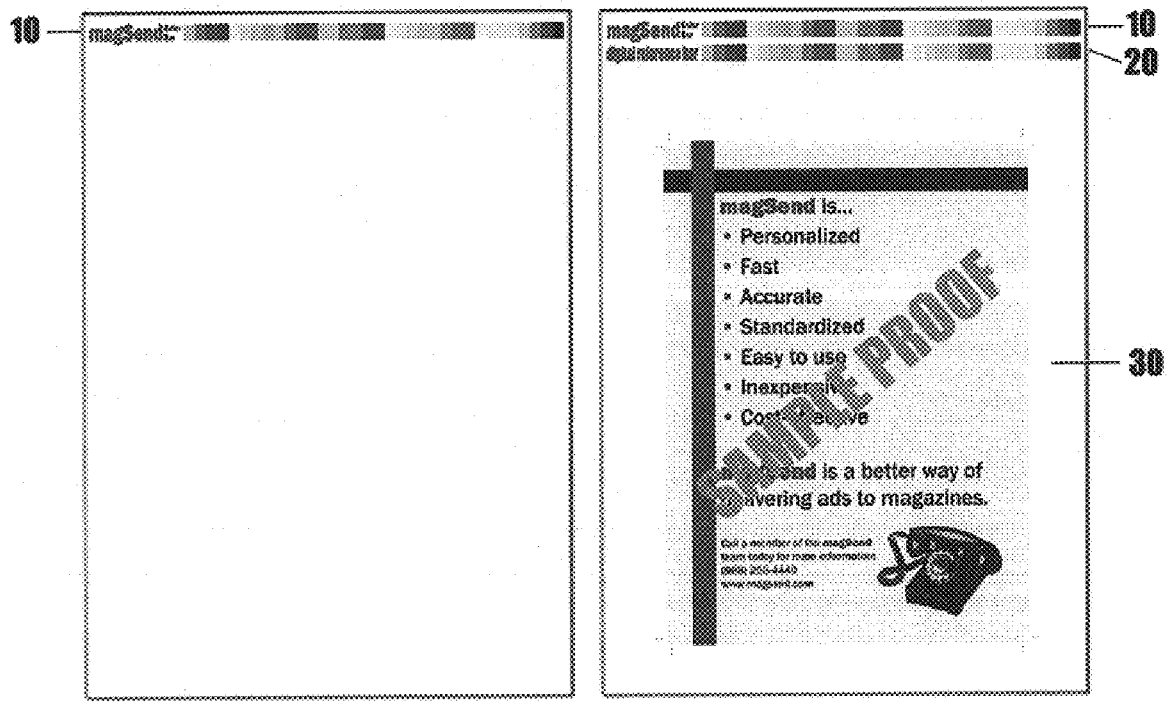
FIG. 2A Pre-Printed Color Bar on Proofing Paper prior to use
FIG. 2B Valid Proof with matching Color Bar printed on an Inkjet

US 6,721,068 B2

TWO-PART COLOR BAR PROCESS TO ENSURE CALIBRATION OF PROOFING EQUIPMENT

CROSS-REFERENCE TO RELATED APPLICATIONS

This application claims the benefit of U.S. Provisional Application No. 60/357,907 filed Feb. 19, 2002 entitled "TWO-PART COLOR BAR SYSTEM TO ENSURE CALIBRATION OF PROOFING EQUIPMENT."

BACKGROUND OF THE INVENTION

The creation of a cost-effective reliable digital hard proof has eluded the graphic arts industry to date. There are stringent requirements for color consistency and repeatability. These requirements have, in the past, caused digital proofing systems to be expensive, typically in the range of $100,000, and difficult to maintain and keep in calibration. Some systems even require climate and humidity controlled environments to operate properly.

There are three main elements that go into making a digital proof: Data, Materials (ink or toner and paper) and a Marking Engine. If the materials and marking engine are good, then a valid proof should be able to be produced provided that the data is properly prepared, and the marking engine is calibrated. Even if a good quality proof is produced, there is still the problem of getting the printer or publisher to accept it.

Over the past few years the cost of inkjet and laser printers has declined, and the quality of their output has improved dramatically. These printers are starting to be used to proof material for reproduction on printing presses. However, due to inconsistencies in output, printers and publishers are reluctant to accept these low cost proofs as a valid representation of a digital file to be printed.

The present invention addresses this need by providing a two-part color bar process, one pre-printed (preprinted) and one printed with the proof content, thus allowing inexpensive inkjet or laser printers to produce color proofs that can be demonstrated as being valid. The process provides a quick check to ensure that the color being output by a marking engine on specially prepared proofing material is within acceptable calibration limits.

BRIEF SUMMARY OF THE INVENTION

A hard proof is created that can be visually inspected to determine if it meets industry standards. The proof has a content image portion and color bar image data. To create the hard proof, a sheet of proofing paper is provided that has one or more known good first color bars pre-printed thereon, but no content image portion printed thereon. The content image portion of the proof and one or more second color bars are then printed on the sheet of proofing paper. The one or more second color bars are printed on the proofing paper in a pre-defined relationship to the one or more first color bars so as to allow for visual inspection directly on the proofing paper using only the color bar image data of the first and second color bars, and without using any external color reference materials. A visually discernable color match indicates that a proof which meets industry standards has been made and a visually discernable color mismatch indicates that a proof which meets industry standards has not been made.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1 is a flowchart of the steps associated with one preferred embodiment of the present invention;

FIGS. 2A–2B show an example of a two color bar process in accordance with one preferred embodiment of the present invention; and FIGS. 3A–3C show an example of an overlay process in accordance with one preferred embodiment of the present invention.

DETAILED DESCRIPTION OF THE INVENTION

Figure 1:
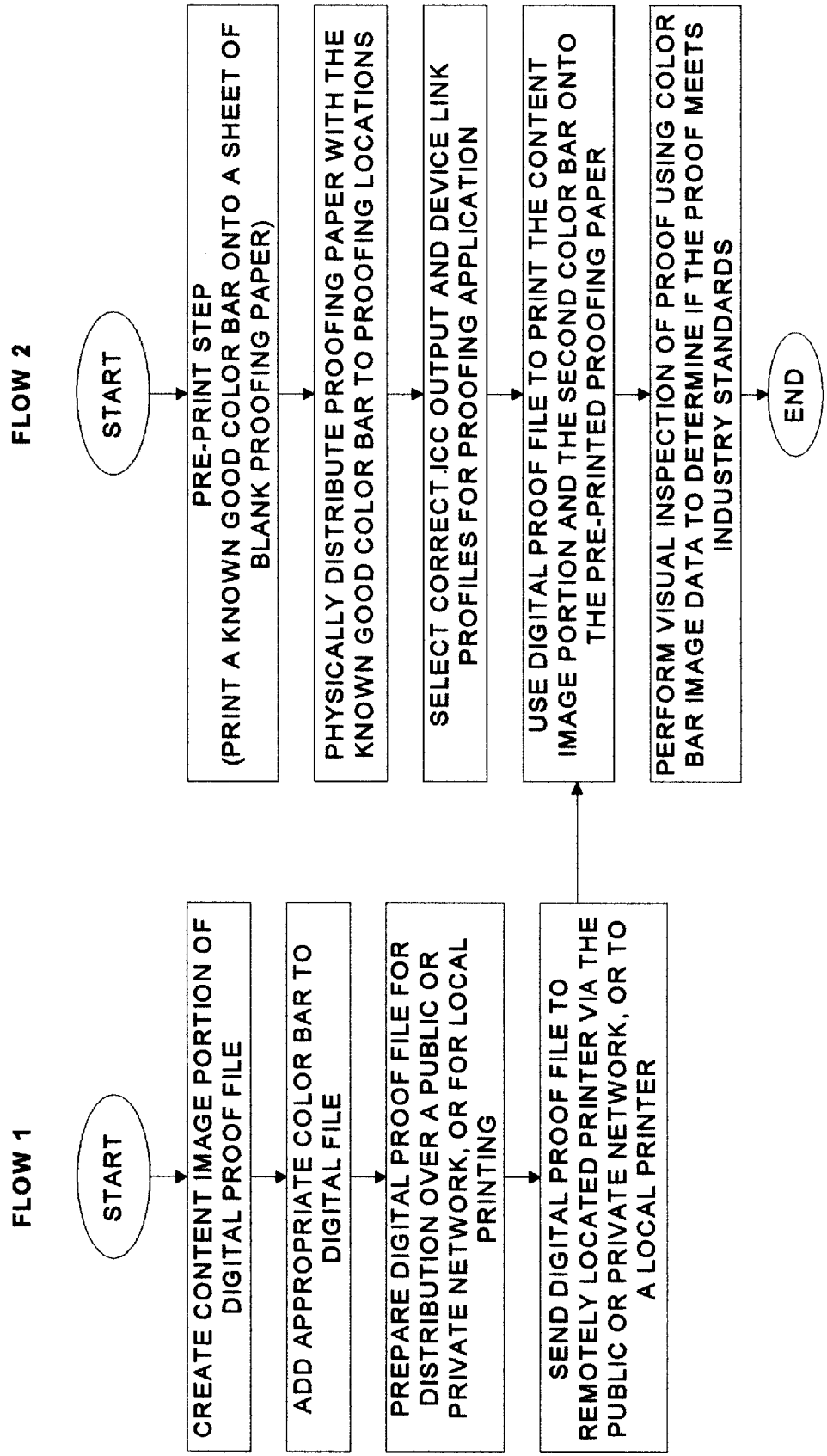

Certain terminology is used herein for convenience only and is not to be taken as a limitation on the present invention. In the drawings, the same reference letters are employed for designating the same elements throughout the several figures.

The average human eye can detect color variation that has a Delta-E (CIE measure of total color difference calculated as the combined squares of the chromaticity differences, Delta-A, Delta-B and Lightness difference Delta-L) of less than four. This is good enough to meet the prevailing industry standards for color proofing accuracy, in terms of color match. It therefore stands to reason, that if an easy color matching system that accurately characterizes the performance of the imaging engine when the proof is created (digital color bar), relative to a known good color target (pre-printed standard color bar) is presented to a person, the human eye's color perception can effectively validate the proof.

Currently, proofing material is distributed as blank sheets. During one conventional proof creation process, a marking engine prints the content image portion (proof content) and color bar image data (e.g., one or more proofing color control bars or color bars) on the proof. A calorimeter or photospectrometer (spectrophotometer) may then used to measure the color bar and determine if it was in specification. Alternatively, an external reference color bar may be compared to the color bar on the proof. Both of these schemes have significant deficiencies. Color measuring equipment is expensive to purchase and maintain. Also, a proof may be physically routed to different people and places before it is approved. Each person who reviews the proof would need access to color measuring equipment or to the same external reference color bar to properly review the color accuracy of the proof.

The present invention uses color-proofing material (paper) with a pre-printed color bar or color bars in a specific location, and then adds digital information to the proofing data file that represents a corresponding color bar or color bars. For simplicity, the subsequent explanation will presume that there is only one pre-printed color bar and only one digital proofing color bar. If, after imaging, the two color bars on the proof (i.e., the pre-printed standard, and the digitally imaged color bar) visually match to an average human eye, then the printer, data, and materials are properly calibrated, and thus an acceptable proof has been produced. If the two color bars do not visually match to an average human eye, the output is not a valid proof. Some potential reasons for not obtaining a valid proof are as follows:

1. The wrong type of proofing paper may have been selected for the data to be printed.
2. The printer has a calibration problem. (The printer needs to be recalibrated.)
3. The marking engine has a problem.
4. An incorrect digital reference color bar ICC profile set was used.

As defined herein, an "ICC profile" may be a single ICC profile, or the combination of a device link and an output profile.

The use of a pre-printed and digitally imaged color bar on the same sheet of paper makes this method completely portable, since it travels with the proof. Therefore, all parties relying on the proof can be assured that it was produced properly, without having to employ any additional equipment, color bar charts or other references. This portability feature is extremely important since one of the main purposes of a proof is to communicate color to different people in the print production process. Thus, a designer's concept can be reviewed by their client, and then passed on to a pressman for reproduction.

Also, by creating a standard two-part checking system, proofs can be reliably produced on many different marking engines, in various locations. This saves time and money, since proofs made in accordance with the present invention do not need to be physically shipped from place to place, but can be imaged when and where needed. If the digitally produced color bars matches the standard, pre-printed bar, then all the marking engines are calibrated similarly, and therefore their color output is consistent and dependable.

In one embodiment of the invention, a Hewlett-Packard® (HP) DesignJet 10 ps or 20 ps Inkjet printer and HP inkjet inks are used with CGS (Computer Graphic Systems) Publication Proofing Paper. The paper is imaged with a pre-printed color bar and physically distributed to the remote proofing site. The proof file has specific ICC profiles associated with it and the corresponding color bar appended to it. The proof file is then packaged for distribution over a public or private electronic network, such as the Internet. Finally, the proof file is electronically sent to the remote HP 10 ps or 20 ps printer and imaged on the proofing paper with the pre-printed color bar. If the two color bars visually match, then the proof is valid.

In an alternative embodiment of the invention, additional color bars may be used. For example, the proof may have two or more of the same or different color bars which are subsequently compared to two or more of the same or different color bars that are imaged on the proofing paper.

OVERVIEW OF TWO COLOR BAR PROCESS

FIG. 1 is a flowchart of the steps associated with one preferred embodiment of the present invention. For simplicity, the process in the flowchart presumes that there is only one pre-printed color bar and only one digital proofing color bar. The first step in the process is to print a known good color bar onto a blank sheet of proofing paper. The proofing paper is pre-printed by the manufacturer with the color bar, and thus this step is not performed during the proof production process. However, in another embodiment of the present invention, a finisher prints the color bar from a digital file onto a completely blank piece of proofing paper prior to distribution to the remote printing site.

Flow 1 steps:
1. Create content image portion of digital proof file.
2. Add appropriate color bar to digital proof file.
3. Prepare digital proof file for distribution over public or private network, or for local printing.
4. Send digital proof file to a remotely located printer via the public or private network, or to a local printer. In this step, the digital proof file is sent to the proofing location (e.g., marking engine).

Flow 2 steps:
1. Pre-print step: Print a known good color bar onto a sheet of blank proofing paper.
2. Physically distribute proofing paper with the known good color bar to proofing locations.
3. Select correct ICC output and device link profiles for proofing application.
4. Use digital proof file (from step 4 of flow 1) to print the content image portion and the second color bar onto the pre-printed proofing paper.
5. Perform visual calibration inspection of proof using color bar image data to determine if the proof meets industry standards. A visually discernable color mismatch indicates that the proof does not meet industry standards. One example of an industry standard is the SWOP standards discussed below. "Contract proofing" or "contract quality" standards are other industry terminologies used to designate industry standards.

EXAMPLE OF TWO COLOR BAR PROCESS

FIG. 2A shows a pre-printed color bar 10 on proofing paper prior to use (i.e., prior to the printing of the content image portion). The pre-printed color bar need not necessarily be generated using the same digital color bar file that is used to create the digital color bar in the digital proof file. The color bar is not shown to scale.

FIG. 2B shows a valid proof printed on an inkjet printer with a matching second color bar 20 printed adjacent to the pre-printed color bar 10. The valid proof thus contains a content image portion 30, and color bar image data (collectively, referring to the the pre-printed color bar 10 and the second color bar 20). The color bars 10 and 20, and content image portion 30 are not shown to scale.

If the two color bars do not match when the proof is printed, the printing parameters should be checked to see if they are properly set and the printer (here, the HP 10 ps or 20 ps) should be recalibrated in accordance with the manufacturer's instructions.

The two-part color bars can be created in a number of different ways, including creating two distinct and preferably adjacent color bars as shown above, or by using overlay techniques that produce a single modified color bar from a single pre-printed color bar. Since most marking engines are based upon process color imaging, a subtractive color model can be assumed. This means that by overlaying a pre-printed color bar or color spot with a specific color rendered by the marking engine, a different color will be produced.

For instance, overlaying cyan with yellow creates the color green. The relative percentages (amounts) of the two colors determine the exact shade of green produced. Thus, a pre-printed spot of cyan can be imaged, and a pre-printed spot of green can also be imaged. At proofing time, the marking engine prints the correct amount of yellow over the pre-printed cyan spot to create the green target value. If the printer is properly calibrated, the two spots will look the same.

In sum, when using two adjacent color bars (one pre-printed and one printed with the proof), the two color bars have an identical color appearance when imaged correctly with their corresponding ICC profiles using a calibrated marking system.

EXAMPLE OF OVERLAY PROCESS

Figure 3A:
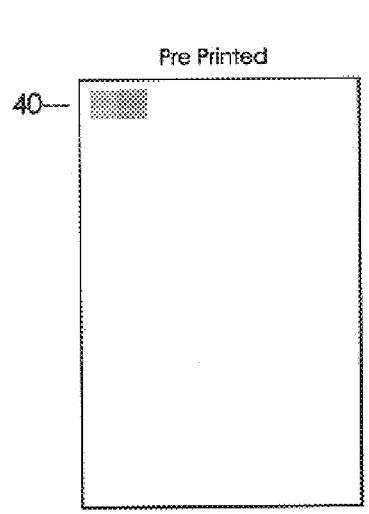
Figure 3B:
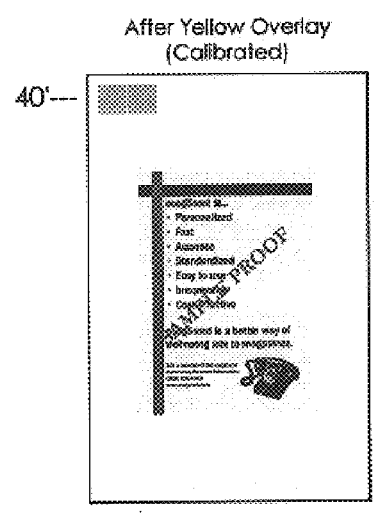
Figure 3C:
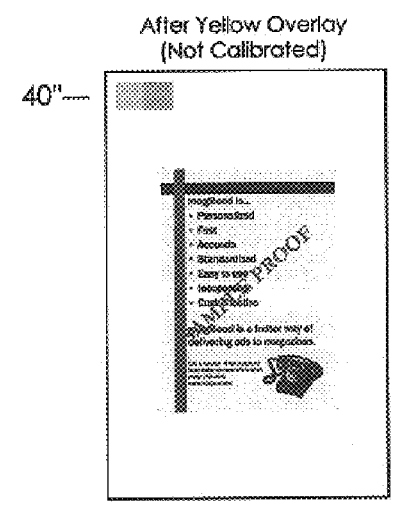

FIGS. 3A–3C show an example of the overlay process. FIG. 3A shows pre-printed color bars 40 on proofing paper prior to the printing of the content image portion. FIG. 3B shows the pre-printed color bars 40' after a yellow overlay (yellow over cyan, there is no overlay color in the green location). The two color bars are visually indistinguishable from one another and thus the printer is presumed to be properly calibrated and the proof is presumed to be valid. FIG. 3C shows the pre-printed color bars 40" after a yellow overlay. Unlike FIG. 3B, the two color bars are visually distinguishable from one another and thus the printer is presumed to be not properly calibrated and the proof is presumed to be not valid. The elements in FIGS. 3A–3C are not to scale.

Three or more colors may be used to create overlays, and thus test various calibration points.

COLOR MANAGEMENT

Color management is an integral part of this proofing system. Many different color management schemes exist. The two parts of the color bar system are designed to match only if the color management system being used is properly applied. In one preferred embodiment of the present invention, ICC profiles are used to characterize color space. This selection is due to its acceptance in the industry, and conformance to current standards.

Proofs made for the publication market must meet SWOP (Specifications for Web Offset Printing) standards. In this case, an ANSI/CGATS TR001 output profile will be applied to the digital proof file and the digital component of the two-part color bar system. The pre-printed standard color bar has been designed to ensure that it is a perceptual match to its digital counterpart when properly imaged. The result is that if the wrong proofing media is used, or if an inappropriate ICC color profile is applied, or if the wrong printer output resolution is selected, the two color bars will likely not match. It may be possible for the color bars to match even with an inappropriate ICC profile. If the two color bars match, the proof is highly likely to be valid since the selected ICC profile must very close to (i.e., within proofing standards wherein Delta-E is less than four) the preferred ICC profile.

A different ICC profile may be applied for commercial printing applications. Since there is no single standard that characterizes commercial presses, the pre-printed standard color bar will be static, while the digital component will be designed to perceptually match to it's counterpart when the correct ICC output and device link profiles are applied. This means that a different digital color bar will exist for each different ICC profile. The name of the profile used will be imaged to ensure that the correct color management has been applied. Again, if the two-part color bar matches, then a valid proof has been made.

One of the benefits of this approach is that the end-user may not have to apply any color management, and therefore will need no special color management knowledge or tools to benefit from the process. The color management will be applied automatically based upon stored production parameters, prior to the remote proofing file being created.

Thus, the user only needs to load the correct media into the printer and set the printer options properly to get the full benefits of sophisticated color management.

The two-part color bar system appears at first glance deceptively simple. It is easy for the end user to implement and provides assurance to all parties using the system that accurate color proofs have been made. However, the application of color management tools, in conjunction with the design of the color bars, and accounting for production specific color characteristics is a complex relationship to manage. The bottom line is that the end-user gets all the benefits of a very sophisticated technology, without having to purchase expensive color management tools, or even learning how to properly characterize color. This system allows for the easy checking and validation of remotely created digital proofs, and can be applied to a wide variety of color imaging devices. It makes remote digital proofing a technically feasible, economically attractive, and extremely reliable technology.

The present invention may be implemented with any combination of hardware and software. If implemented as a computer-implemented apparatus, the present invention is implemented using means for performing all of the steps and functions described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method of creating a hard proof that can be visually inspected to determine if the hard proof meets industry standards, the proof having (i) a content image portion, and (ii) color bar image data, the method comprising:

(a) providing a sheet of proofing paper having one or more standard first color bars pre-printed thereon, but no content image portion printed thereon; and (b) printing the content image portion of the proof and one or more second color bars on the sheet of proofing paper, the one or more second color bars being printed on the proofing paper in a predefined relationship to the one or more first color bars so as to allow for visual inspection directly on the proofing paper using only the color bar image data of the first and second color bars, and without using any external color reference materials, wherein a visually discernable color match indicates that a proof which meets industry standards has been made and a visually discernable color mismatch indicates that a proof which meets industry standards has not been made.

2. The method of claim 1 wherein the first and second color bars are printed adjacent to each other.

3. The method of claim 2 wherein the first and second color bars are selected so as to have identical color appearance when imaged with their corresponding ICC profiles using a calibrated marking system.

4. The method of claim 1 wherein one or more of the second color bars are printed over at least a portion of the one or more first color bars, wherein the subtractive colors are used for the visual inspection.

5. The method of claim 4 wherein the first and second color bars have different color appearance when imaged with their corresponding ICC profiles using a calibrated marking system.

6. The method of claim 1 wherein the content image portion and the one or more second color bars are part of a digital proof file, and step (b) is performed by printing the digital proof file.

7. The method of claim 6 further comprising:
(c) adding the one or more second color bars and associating at least one ICC profile with the digital proof file;
(d) preparing the digital proof file for distribution over a public or private network; and
(e) receiving the digital proof file at a remote location for printing in step (b) of the digital proof file at the remote location.

8. The method of claim 1 wherein step (b) is performed by a marking engine.

9. The method of claim 1 wherein a color mismatch indicates (i) a printer calibration problem, or (ii) a marking engine problem, or (iii) selection of the wrong type of proofing paper, or (iv) use of an incorrect digital reference color bar ICC profile set.

10. The method of claim 1 wherein step (b) occurs at a proofing location, the method further comprising:
(c) prior to step (a), printing the one or more first color bars onto the sheet of proofing paper prior to its distribution to the proofing location.

* * * * *

UNITED STATES PATENT AND TRADEMARK OFFICE
CERTIFICATE OF CORRECTION

PATENT NO. : 6,721,068 B2  Page 1 of 1
DATED : April 13, 2004
INVENTOR(S) : Mark A. Weiss It is certified that error appears in the above-identified patent and that said Letters Patent is hereby corrected as shown below:

<u>Title page,</u>
Item [54], Title, should read:
-- TWO-PART COLOR BAR PROCESS TO ENSURE VALIDITY OF PROOF --

Signed and Sealed this

Eighth Day of June, 2004

JON W. DUDAS
*Acting Director of the United States Patent and Trademark Office*